(12) United States Patent
Thiagarajan et al.

(10) Patent No.: US 8,283,390 B2
(45) Date of Patent: Oct. 9, 2012

(54) SILOXANE BLOCK COPOLYMER NANOPOROUS FOAMS, METHODS OF MANUFACTURE THEREOF AND ARTICLES COMPRISING THE SAME

(75) Inventors: Chinniah Thiagarajan, Karnataka (IN); Bernd Jansen, Bergen op Zoom (NL); Santhosh Kumar Rajendran, Arakkonam Tamilnadu (IN); Vauhini RM, Karnataka (IN); Safwat E. Tadros, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 163 days.

(21) Appl. No.: 12/557,083

(22) Filed: Sep. 10, 2009

(65) Prior Publication Data

US 2011/0060067 A1 Mar. 10, 2011

(51) Int. Cl.
*C08G 77/00* (2006.01)
*C08G 77/04* (2006.01)
*C08G 77/14* (2006.01)
*C08J 9/00* (2006.01)

(52) U.S. Cl. .............. 521/154; 521/81; 521/82; 521/86; 521/91; 521/112

(58) Field of Classification Search .................. 521/124, 521/79, 81, 90, 154
See application file for complete search history.

(56) References Cited

U.S. PATENT DOCUMENTS

| 4,616,042 | A | * | 10/1986 | Avakian ........................... 521/81 |
|---|---|---|---|---|
| 7,455,941 | B2 | * | 11/2008 | Evans et al. ..................... 430/69 |
| 2004/0082276 | A1 | | 4/2004 | Prasad et al. |
| 2004/0108623 | A1 | * | 6/2004 | Deeter et al. ............. 264/331.12 |
| 2004/0198853 | A1 | * | 10/2004 | Saito et al. ...................... 521/79 |
| 2005/0154150 | A1 | | 7/2005 | Wei et al. |
| 2006/0127663 | A1 | | 6/2006 | Strey et al. |
| 2006/0142504 | A1 | | 6/2006 | Ree et al. |
| 2008/0188581 | A1 | * | 8/2008 | Lee et al. ...................... 521/154 |
| 2009/0148665 | A1 | | 6/2009 | Thiagarajan et al. |
| 2009/0168176 | A1 | | 7/2009 | Sriraman et al. |

OTHER PUBLICATIONS

International Search Report dated Oct. 13, 2010 for International Application No. PCT/US02010/048251.
Written Opinion of the International Search Report dated Oct. 13, 2010 for International Application No. PCT/US2010/048251.

* cited by examiner

*Primary Examiner* — Randy Gulakowski
*Assistant Examiner* — Kara Boyle
(74) *Attorney, Agent, or Firm* — Cantor Colburn LLP

(57) ABSTRACT

Disclosed herein is a foam that includes a polysiloxane block copolymer; the polysiloxane block copolymer including a first block that comprises a polysiloxane block and a second block that includes an organic polymer; the second block not containing a polysiloxane; the polysiloxane block being about 5 to about 45 repeat units; the foam having average pore sizes of less than or equal to about 100 nanometers.

16 Claims, 4 Drawing Sheets

100 nm

100nm 100 nm

SILOXANE BLOCK COPOLYMER NANOPOROUS FOAMS, METHODS OF MANUFACTURE THEREOF AND ARTICLES COMPRISING THE SAME

BACKGROUND

This disclosure relates to siloxane block copolymer nanoporous foams, methods of manufacture thereof and to articles comprising the same.

Foams having pores in the nanometer regime (e.g., aerogels having average pore sizes of less than or equal to about 100 nanometers) generally display superior thermal conductivity over foams that have pores having sizes that are greater than or equal to about 100 nanometers. The superior thermal conductivity of aerogels is attributed to the fact that air or vapor molecules in the pores cannot interact one another because the pore sizes prevent the molecules from traveling distances generally associated with their mean free paths.

While aerogels generally display superior thermal properties over other foams that have larger pore sizes, their mechanical properties such as, for example, their tensile strength, impact strength, and the like, are generally so low that they cannot even be manufactured in monolithic form. As a result of their inferior mechanical properties, they have to be compounded with other binders in order to manufacture a usable monolithic product. The compounding with other binders generally reduces the thermal conductivity of the usable monolithic product.

In addition to having inferior mechanical properties, aerogels are manufactured using supercritical extraction. The use of supercritical extraction involves the use of high pressures and high-pressure vessels, which are expensive and can be hazardous to personnel involved with the production and manufacturing of aerogels.

It is therefore desirable to manufacture foams having pores in the nanometer regime that display superior mechanical properties over aerogels. It is also desirable to manufacture foams by methods that are less expensive and hazardous when compared with processes involved with the manufacture of aerogels. Further, it is also preferable to have closed pore structure for improved mechanical properties. Aerogels usually have open porous morphology.

SUMMARY

Disclosed herein is a foam comprising a polysiloxane block copolymer; the polysiloxane block copolymer comprising a first block that comprises a polysiloxane block and a second block that comprises an organic polymer; the second block not containing a polysiloxane; the polysiloxane block being about 5 to about 45 repeat units; the foam having average pore sizes of less than or equal to about 100 nanometers.

Disclosed herein too is a method comprising immersing a polysiloxane block copolymer with fluid to form a fluid saturated-polysiloxane block copolymer; the polysiloxane block copolymer comprising a first block that comprises a polysiloxane block and a second block that comprises an organic polymer; the second block not containing a polysiloxane; the polysiloxane block being about 5 to about 45 repeat units; increasing the temperature of the fluid saturated-polysiloxane block copolymer; and foaming the polysiloxane block copolymer to form a foam that has average pore sizes of less than or equal to about 100 nanometers.

DETAILED DESCRIPTION

Figure 1:
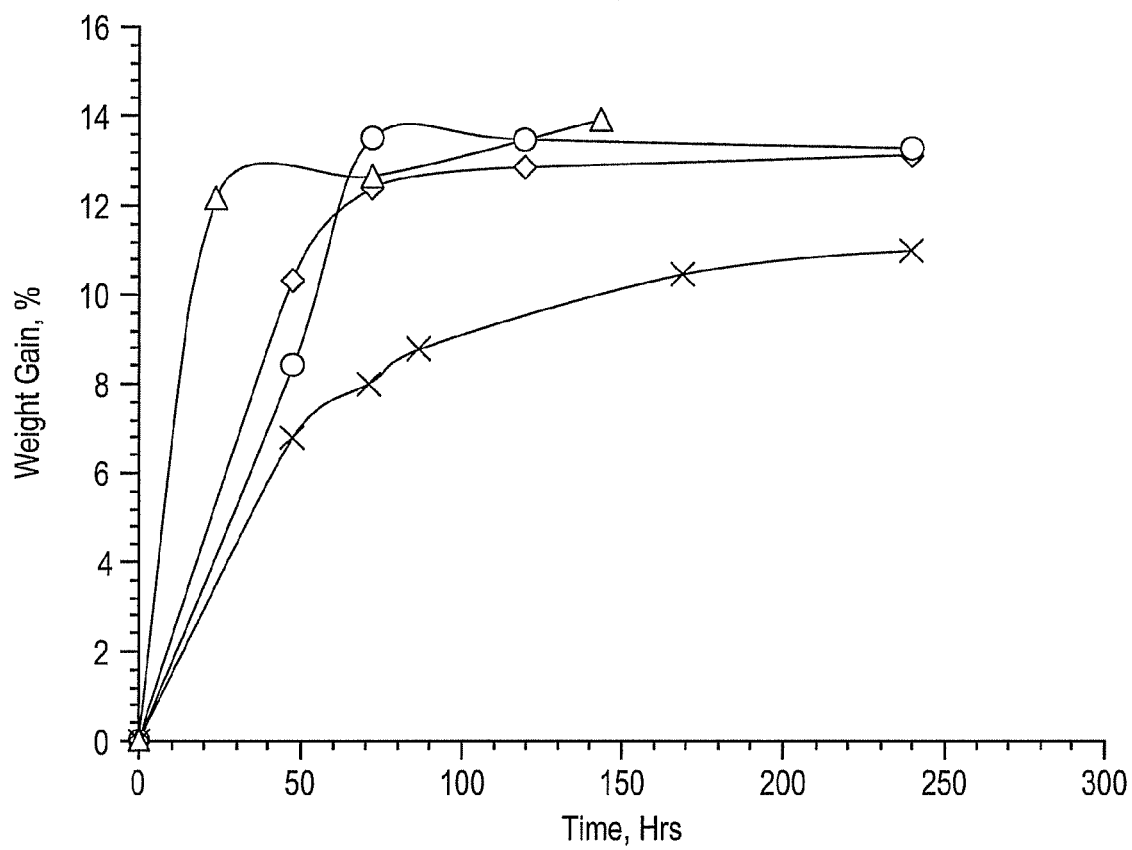
FIG. 1 is a graph reflecting the percent weight gain when measured against time for different samples.

Disclosed herein are nanoporous foams that comprise polysiloxane block copolymers that have polysiloxanes block lengths of about 5 to about 45 repeat units. The polysiloxane block copolymers generally comprise a first block that comprises a polysiloxane and a second block polymer that is copolymerized with the first block. Disclosed herein too are methods of manufacturing nanoporous foams. The methods of manufacturing these foams are non-hazardous. In one embodiment, the nanoporous foams have average pore sizes of less than or equal to about 100 nanometers. The nanoporous foams are optically transparent, display superb thermal insulating properties, mechanical properties and dielectric properties.

The use of polysiloxane block copolymers having polysiloxane block lengths of about 5 to about 45 repeat units increases the solubility of carbon dioxide into the copolymer used for manufacturing the foam. The increased solubility permits the manufacturing of nanoporous foams having a high density of pores that have diameters of less than or equal to about 100 nanometers.

The polysiloxane block copolymers may be an alternating block copolymer, a graft copolymer or a star block copolymer. The polysiloxane block copolymers may be di-block, tri-block, or star-block copolymers.

As noted above, the polysiloxane block copolymers generally comprise a first block that comprises a polysiloxane and a second block polymer that is copolymerized with the first block. The second block does not contain a polysiloxane. Examples of organic polymers that can be used in the second block polymer are polyacetals, polyolefins, polyacrylics, polyacrylates, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyurethanes, or the like, or a combination comprising at least one of the foregoing organic polymers.

Exemplary block copolymers are polycarbonate-polysiloxane block copolymers, copolyester-carbonate-polysiloxane block copolymers, polyester-polysiloxane block copolymers, polyarylate-polysiloxane block copolymers, or the like, or a combination comprising at least one of the foregoing polymers.

An exemplary polycarbonate-polysiloxane block copolymer is one having the structure shown in the Formula (I) below:

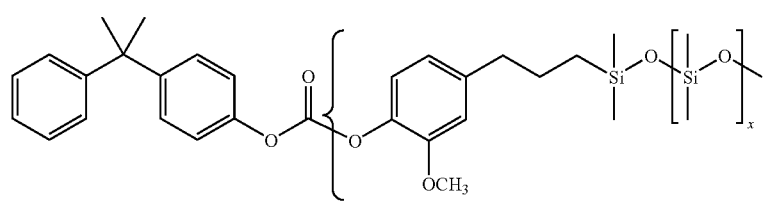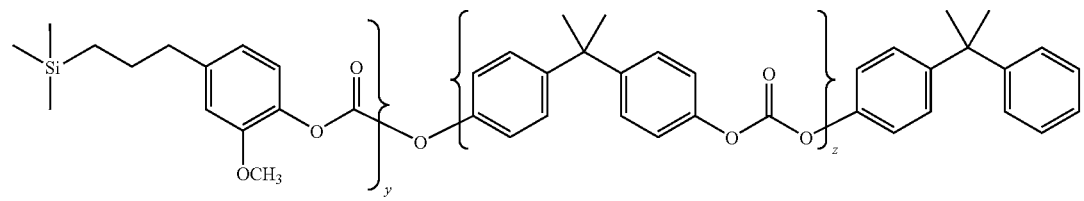

Formula (I)

where the polysiloxane blocks are endcapped with eugenol, where x is about 1 to about 45, y is about 1 to about 90 and z is about 1 to about 90.

The polyesters used in the polyester-polysiloxane block copolymers or the copolyester-carbonate-polysiloxane block copolymers can be aliphatic polyesters or aromatic polyesters. Examples of polyesters that can be used in the polyester-polysiloxane block copolymers are polyethelene terephthalate (PET), polybutylene terephthalate (PBT), poly(1,4-cyclohexane-dimethanol-1,4-cyclohexanedicarboxylate) (PCCD), poly(trimethylene terephthalate) (PTT), poly(cyclohexanedimethanol-co-ethylene terephthalate) (PETG), poly(ethylene naphthalate) (PEN), poly(butylene naphthalate) (PBN), polyarylates, or the like, or a combination comprising at least one of the foregoing polyesters.

Useful polysiloxane blocks comprise repeating diorganosiloxane units, also referred to as "siloxane units", of Formula (II):

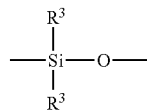

Formula (II), wherein each occurrence of $R^3$ may be the same or different and is independently a $C_{1-12}$ hydrocarbyl. The siloxane units are generally present in the form of blocks containing about 3 to about 45 siloxane repeat units, specifically about 4 to about 40 siloxane repeat units, more specifically about 5 to about 35 siloxane repeat units. The number of siloxane repeat units may represent an average value.

The siloxane units are generally present in the forms of domains with an average diameter size of about 1 to about 100 nanometers, specifically about 2 to about 50 nanometers, more specifically about 5 to about 10 nanometers.

The first block (that comprises the polysiloxane) is generally present in an amount of about 1 weight percent (wt %) to about 25 wt %, specifically about 3 to about 20 wt %, and more specifically about 4 to about 15 wt %, based on the total weight of the polysiloxane block copolymer. In an exemplary embodiment, the first block is generally present in an amount of about 5 to about 10 wt %, based on the total weight of the polysiloxane block copolymer. It has been noted that when the first block is used in an amount of about 5 wt %, based on the total weight of the polysiloxane block copolymer, the solubility of carbon dioxide in the polysiloxane block copolymer is increased by an amount of over 50 wt % when compared with a polymer that does not contain the first block.

The second block polymer can have a number average molecular weight of about 500 grams per mole (g/mole) to about 50,000 g/mole, specifically about 1,000 grams per mole (g/mole) to about 40,000 g/mole, and more, and more specifically about 5,000 grams per mole (g/mole) to about 30,000 g/mole. An exemplary number average molecular weight for the second block copolymer is about 23,400 g/mole.

The second block polymer is generally present in an amount of about 75 weight percent (wt %) to about 99 wt %, specifically about 80 to about 96 wt %, based on the total weight of the polysiloxane block copolymer, and more specifically about 90 to about 95 wt %, based on the total weight of the polysiloxane block copolymer.

The nanoporous foam can be manufactured by several methods. Batch methods and continuous methods can be used. In one exemplary embodiment, in a batch process, a block of the polysiloxane block copolymer is first immersed in a fluid under pressure for a period of time to form a fluid-saturated-polysiloxane block copolymer. The fluid can be any fluid that is soluble in the polysiloxane block copolymer and which upon the removal of pressure can undergo nucleation and growth to form the nanoporous foam. Examples of suitable fluids are carbon dioxide, nitrogen, chlorofluorocarbons, and the like. An exemplary fluid is carbon dioxide. The carbon dioxide can be in gaseous, liquid or supercritical form.

If desired, a blowing agent also referred to herein as a foaming fluid may be used. Suitable blowing agents that may be used include inorganic agents, organic agents and other chemical agents. Exemplary inorganic blowing agents include carbon dioxide, nitrogen, argon, water, air, nitrogen, and inert gases such as helium and argon. Exemplary organic agents include aliphatic hydrocarbons having 1 to about 9 carbon atoms, aliphatic alcohols having 1 to about 3 carbon atoms, and fully and partially halogenated aliphatic hydrocarbons having 1 to about 4 carbon atoms.

Aliphatic hydrocarbons include methane, ethane, propane, n-butane, isobutane, n-pentane, isopentane, neopentane, or the like. Aliphatic alcohols include methanol, ethanol, n propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1 difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2 difluoropropane, 1,1, 1-trifluoropropane, perfluoropropane, dichloropropane, difluoropropane, perfluorobutane, perfluorocyclobutane, or the like.

Partially halogenated chlorocarbons and chlorofluorocarbons include methyl chloride, methylene chloride, ethyl chloride, 1,1,1-trichloroethane, 1,1-dichloro-1-fluoroethane (HCFC-141 b), 1-chloro-1,1-difluoroethane (HCFC-142b), chlorodifluoromethane (HCFC-22), 1,1-dichloro-2,2,2-trifluoroethane (HCFC-123), 1-chloro-1,2,2,2-tetrafluoroethane (HCFC-124), or the like.

Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Other chemical agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N' dimethyl-N, N'-dinitrosoterephthalamide, trihydrazino triazine, or the like.

In one embodiment, the blowing agent may be selected from the group consisting of carbon dioxide, air, nitrogen, argon, gaseous hydrocarbons, or combinations thereof. The blowing agent may be selected from the group consisting of solid carbon dioxide, liquid carbon dioxide, gaseous carbon dioxide, or supercritical carbon dioxide. Any of the inert gases, such as for example, helium, xenon, and argon may also be used. Non-limiting examples of gaseous hydrocarbons include methane, ethane, propane, and butane. In another embodiment, halohydrocarbons that would be expected to be in a gaseous form at ambient temperature and pressure may be used. Examples of such halohydrocarbons include fluorohydrocarbons, fluorocarbons, chlorocarbons, and chlorofluorocarbons.

The temperature of the block of the polysiloxane block copolymer now saturated with the fluid is then elevated to produce a nanoporous foam. During the elevation of the temperature of the block of the polysiloxane block copolymer, the pressure may be reduced if desired. Without being limited to theory, when the temperature is raised, the dissolved fluid undergoes nucleation and growth to produce a nanoporous foam. The size of the pores can be controlled by quenching the foam in a cooler fluid if desired.

Pressure may be applied to facilitate the diffusion of the fluid (e.g., carbon dioxide) into the polysiloxane block copolymer to form the carbon dioxide-saturated polysiloxane block copolymer. The pressure may be applied for a time effective to saturate the polysiloxane block copolymer with the fluid. The pressure used to facilitate the immersion of carbon dioxide into the polysiloxane block copolymer is greater than or equal to about 0.1 newtons per square millimeter ($N/mm^2$) newton per square millimeter k, specifically greater than or equal to about 1 $N/mm^2$, more specifically greater than or equal to about 6 $N/mm^2$, and more specifically greater than or equal to about 10 $N/mm^2$. A pressure of up to about 10 to about 15 $N/mm^2$ may be used to facilitate the diffusion. The temperature may be maintained to further facilitate the diffusion. A temperature of about −140° C. to 500° C. can be applied, specifically between −70° C. to about 200° C., more specifically between −60° C. to about 100° C. An exemplary temperature for diffusion is about 22° C.

Following the saturation of the polysiloxane block copolymer, the pressure may be reduced and the temperature is increased. The increasing in temperature can be conducted and controlled in an oil bath. The temperature is generally increased to a temperature that is greater than the glass transition temperature of the polymer used in the second block. An exemplary temperature for the oil bath is about 40 degrees centigrade (° C.) to about 700° C., specifically about 75 to about 175° C., and more specifically about 100 to about 170° C. An exemplary temperature for the oil bath is about 140° C.

The nanoporous foam may optionally be quenched in a bath in order to control the pore sizes. The bath may contain water, liquid carbon dioxide, liquid nitrogen, dry ice, dry ice mixed with organic solvents, or the like. The bath is maintained at a temperature that is below the glass transition temperature of the second block. An exemplary temperature for the bath is about −140 degrees centigrade (° C.) to about 100° C.

In another embodiment, the nanoporous foam can be manufactured in a continuous process. In an exemplary continuous process, the polysiloxane block copolymer is fed into a device that can apply shear force, extensional force, compressive force, ultrasonic energy, electromagnetic energy and/or thermal energy to the polysiloxane block copolymer. During the application of these forces and forms of energy to the polysiloxane block copolymer, it reaches a temperature above its flow point. The fluid (that is soluble in the block copolymer) is also introduced into the device and dissolves in the polymer under pressure to form the fluid saturated-polysiloxane block copolymer. Upon being ejected from the device, the fluid undergoes nucleation and growth in the polysiloxane block copolymer to produce a nanoporous foam.

Melt blending of the polysiloxane block copolymer involves the use of shear force, extensional force, compressive force, ultrasonic energy, electromagnetic energy, thermal energy or combinations comprising at least one of the foregoing forces or forms of energy, and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces may be conducted in machines such as single or multiple screw extruders, Buss kneaders, Henschel mixers, helicones, Ross mixers, Banbury, roll mills, molding machines such as injection molding machines, vacuum forming machines, blow molding machines, or the like, or a combination comprising at least one of the foregoing machines.

In one embodiment, the melt blending is conducted in an extruder. In another embodiment, the melt blending is conducted in an injection-molding machine.

The pressure used to facilitate the immersion of carbon dioxide into the polysiloxane block copolymer is greater than or equal to about 0.1 ($N/mm^2$), specifically greater than or equal to about 1 $N/mm^2$, more specifically greater than or equal to about 6 $N/mm^2$, more specifically greater than or equal to about 10 $N/mm^2$, more specifically greater than or equal to about 100 $N/mm^2$. A pressure of about 10 to about 1015 $N/mm^2$ may be used. During the application of pressure to facilitate the immersion of the carbon dioxide into the polysiloxane block copolymer, the temperature of the polysiloxane block copolymer may be optionally elevated. In one embodiment, the immersion of the carbon dioxide into the polysiloxane block copolymer can be conducted from room temperature (23 degrees centigrade (° C.)) to about 300° C., specifically about 50 to about 250° C. and more specifically about 100 to about 200° C.

As noted above, the pore sizes can be controlled by quenching the nanoporous foam during expansion. Then quenching is generally conducted in a bath maintained at a temperature that is less than the glass transition temperature of the second block. When the melt blending is conducted in an extruder, the extrudate is quenched in a bath that has a temperature less than or equal to the glass transition temperature of the second block. When the melt blending is conducted in an injection-molding machine, the mold may be set to a temperature that is less than or equal to the glass transition temperature of the second block.

The nanoporous foam manufactured by the methods disclosed herein have an average pore size of about 1 to about 500 nanometers, specifically about 10 to about 80 nanometers, and more specifically about 10 to about 70 nanometers. In one embodiment, the individual pores can have sizes (diameters) of about 2 to about 100 nanometers, about 5 to about 95 nanometers, about 7 to about 90 nanometers, about 10 to about 80 nanometers.

The nanoporous foam manufactured by the methods disclosed herein have a porosity of about 1% to about 99% volume percent, specifically about 5% to about 95% volume percent. In an exemplary embodiment, the nanoporous foam manufactured by the methods disclosed herein have a porosity of about 10% to about 90% volume percent.

The nanoporous foam manufactured by the methods disclosed herein have a bulk density of about 0.01 to about 2 grams per cubic centimeter. In an exemplary embodiment, the nanoporous foam manufactured by the methods disclosed herein have a bulk density of about 0.05 to about 1.1 grams per cubic centimeter.

The nanoporous foam manufactured by the methods disclosed herein have a skeletal density of about 0.01 to about 2 grams per cubic centimeter. In an exemplary embodiment, the nanoporous foam manufactured by the methods disclosed herein have a skeletal density of about 0.01 to about 0.5 grams per cubic centimeter.

The nanoporous foams manufactured by the methods disclosed herein have a thermal conductivity of about 20 to about 0.001 specifically about 15 to about 0.002, and more specifically about 10 to about 0.003 watts per meter-Kelvin (W/m-K) measured as per ASTM D 5930. In an exemplary embodiment, the nanoporous foams manufactured by the methods disclosed herein have a thermal conductivity of about 0.2 to about 0.005 watts per meter-Kelvin (W/m-K).

The nanoporous foams manufactured by the methods disclosed herein have a optical transparency of about 70% to about 99% percent when measured at a thickness of 3 millimeters as per ASTM D 1003. In an exemplary embodiment, the nanoporous foams manufactured by the methods disclosed herein have a optical transparency of about 15% to about 80 percent when measured at a thickness of 3 millimeters as per ASTM D 1003.

In another embodiment, the nanoporous foams can be opaque. In one embodiment, the optical foams can be hazy displaying a haze of about 50% to about 100%, specifically about 60% to about 90%, and more specifically about 65% to about 85%, when measured in a sample having a thickness of about 3 millimeters when measured as per ASTM D 1003. The transparency or opacity of the nanoporous foams depends upon whether the block copolymer used for the foam was initially transparent or opaque. When the block copolymer is optically transparent, the resulting microporous foam is optically transparent. When the block copolymer is opaque, the resulting microporous foam is hazy or opaque.

The foams manufactured by the methods disclosed herein can be used in a variety of different articles. The articles can include thermal insulation, acoustic barriers, filters, membranes for permeability, and the like.

The following examples, which are meant to be exemplary, not limiting, illustrate compositions and methods of manufacturing of some of the various embodiments described herein.

EXAMPLES

Example 1

This example was conducted to demonstrate the increase in solubility of a fluid in polycarbonate-polysiloxane copolymers when compared with only polycarbonate. The polycarbonate polysiloxane copolymer was LEXAN EXL 1434T® obtained from Sabic Innovative Plastics, while the polycarbonate was LEXAN 105® also obtained from Sabic Innovative Plastics. The fluid is carbon dioxide in gaseous form. Samples of polycarbonate-polysiloxane copolymers and polycarbonate each having dimensions of 5 cm×1 cm×3 cm were immersed in a chamber containing carbon dioxide at a pressure of 6 $N/mm^2$ for a period of up to 350 hours. After intervals of 50, 100, 150, 200, 250, 300 and 350 hours, the immersion process was stopped and the samples were taken out and weighed. The percent weight gain was measured and plotted against the time. The FIG. 1 is a graph reflecting the percent weight gain when measured against time for different samples. From the FIG. 1, it can be seen that the samples containing the polysiloxane block copolymer absorb a greater amount of carbon dioxide. The opaque and transparent samples were opaque and transparent grades of polycarbonate (PC EXL provided by Sabic Innovative Plastics) and were opaque and transparent respectively prior to being expanded into a foam.

From the FIG. 1 it can be seen that in less than 25 hours, the samples containing the polysiloxane copolymer absorb about 12 wt % of the carbon dioxide, while the sample containing only the polycarbonate absorbs less than 10 wt % of the carbon dioxide after 250 hours of exposure.

At about 20 hours, the sample containing only polycarbonate has absorbed only about 5 wt % of carbon dioxide. Thus the sample containing the polysiloxane copolymers absorbs carbon dioxide in an amount of greater than or equal to about 50 wt % when compared with samples that do not contain the polysiloxane copolymers.

Example 2

This example was conducted to demonstrate the manufacturing of a foam from a polysiloxane block copolymer. LEXAN EXL 1434T® commercially available from Sabic Innovative Plastics was subjected to gaseous carbon dioxide at a pressure of 55 $kg-f/cm^2$ and room temperature for 408 hours. The sample was then removed and placed in an oil bath at a temperature of 160° C. for 45 seconds. A foam having the properties shown in the Table 1 was manufactured.

TABLE 1

| | |
|---|---|
| Mean pore size | 27.51624 |
| Standard Error | 0.738263 |
| Median | 24.684 |
| Mode | 18.257 |
| Standard Deviation | 11.60272 |
| Sample Variance | 134.623 |
| Kurtosis | 1.429304 |
| Skewness | 1.025041 |
| Range | 70.8 |
| Minimum pore size | 5.063 |
| Maximum pore size | 75.863 |
| Sum | 6796.511 |
| Count (number of pores) | 247 |

Figure 2:
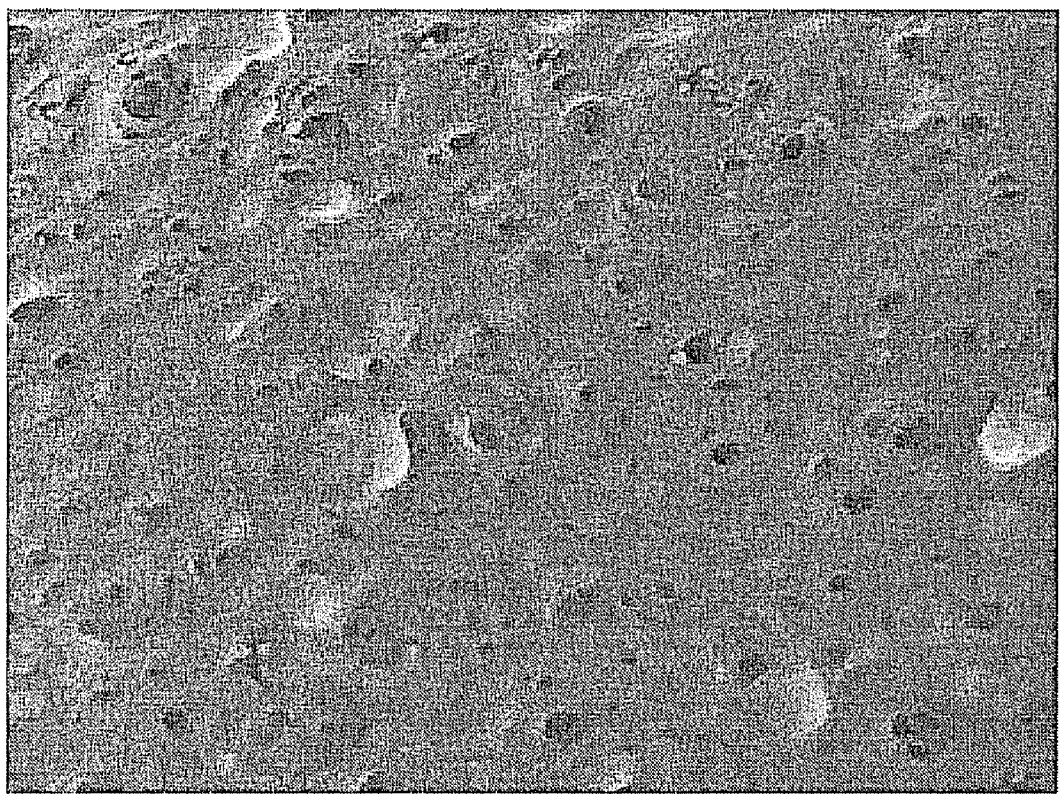
FIG. 2 is a photomicrograph of the foam manufactured in the Example 2.

From the Table 1 it can be seen that the foam has pore sizes of 5 to 75 nanometers. The average cell size is 27.52±11.6 nanometers. The foam bulk density was 713.02 kilograms per cubic meter (kg/m$^3$). A photomicrograph of the foam is shown in the FIG. 2. From the photomicrograph it may be seen that the pores are fairly uniform in size in the nanometer range.

Example 3

This example was conducted to demonstrate the manufacturing of a foam from a polysiloxane block copolymer. LEXAN EXL polymer with polysiloxane domain of a block size of about 10 nanometers was prepared by Sabic Innovative Plastics was subjected to gaseous carbon dioxide at a pressure of 60 N/mm$^2$ and room temperature for 100 hours. The sample was then removed and placed in an oil bath at a temperature of 160° C. for 45 seconds. A foam having the properties shown in the Table 1 was manufactured.

TABLE 2

| | |
|---|---|
| Mean | 8.964 |
| Standard Error | 0.321 |
| Median | 8.620 |
| Mode | 4.700 |
| Standard Deviation | 4.692 |
| Sample Variance | 22.012 |
| Kurtosis | 12.947 |
| Skewness | 2.254 |
| Range | 41.140 |
| Minimum | 2.350 |
| Maximum | 43.490 |
| Sum | 1918.290 |
| Count | 214.00 |
| Largest (1) | 43.490 |
| Smallest (1) | 2.350 |
| Confidence Level (95%) | 0.632 |

Figure 3:
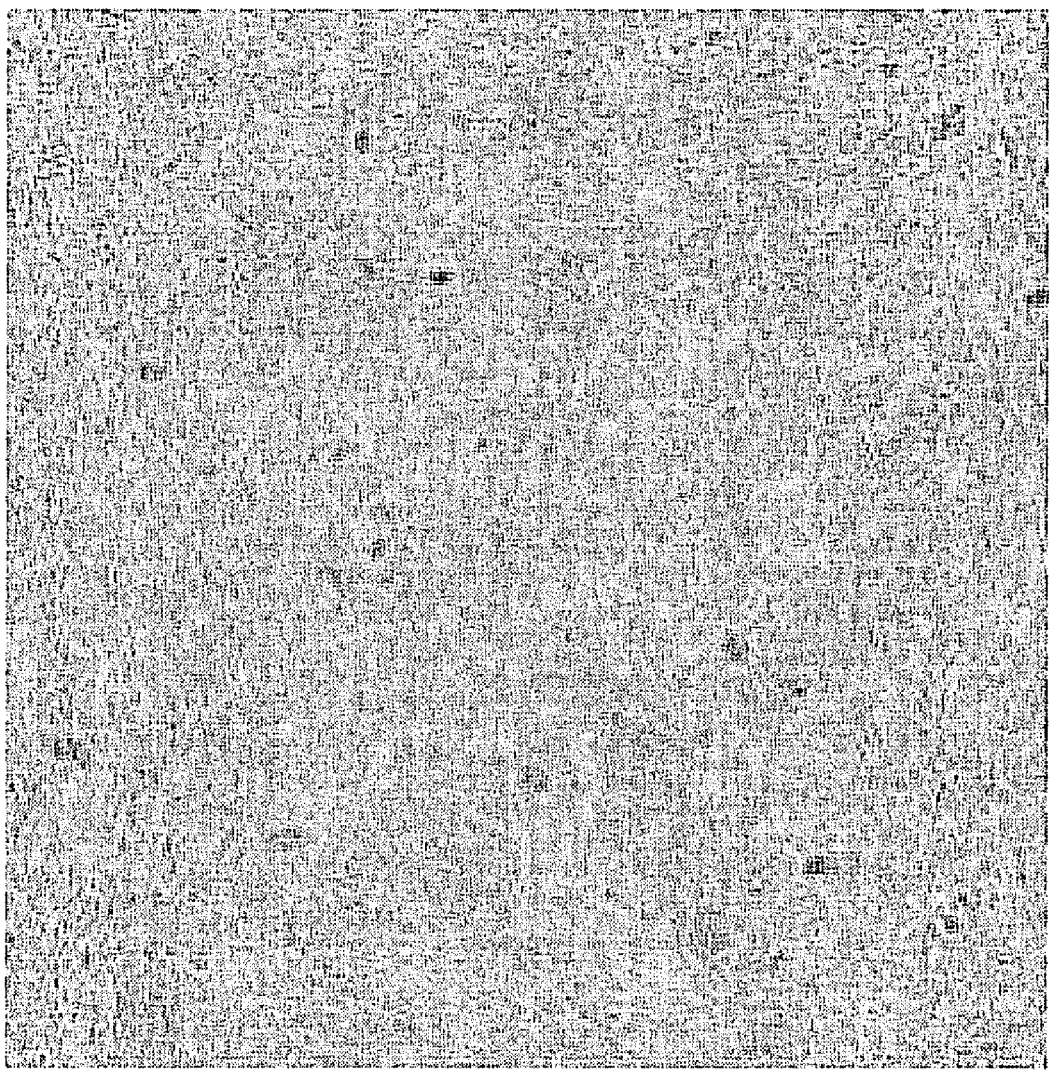
FIG. 3 is a photomicrograph of the foam manufactured in the Example 3.

From the Table 2 it can be seen that the foam has pore sizes of 2.3 to 43.49 nanometers. The average cell size is 8.964±4.69 nanometers. The foam bulk density was 990 kilograms per cubic meter (kg/m$^3$). A photomicrograph of the foam is shown in the FIG. 3. From the photomicrograph it may be seen that the pores are fairly uniform in size in the nanometer range.

Example 4

This example was conducted to demonstrate the manufacturing of a foam from a polysiloxane block copolymer. LEXAN EXL polymer with polysiloxane domains having an average polysiloxane block size of about 45 nanometers was prepared by Sabic Innovative Plastics was subjected to gaseous carbon dioxide at a pressure of 60 N/mm$^2$ and room temperature for 100 hours. The sample was then removed and placed in an oil bath at a temperature of 160° C. for 45 seconds. A foam having the properties shown in the Table 3 was manufactured.

TABLE 3

| | |
|---|---|
| Mean | 12.503 |
| Standard Error | 0.375 |
| Median | 10.94 |
| Mode | 2.35 |
| Standard Deviation | 8.218 |
| Sample Variance | 67.543 |
| Kurtosis | 5.829 |
| Skewness | 1.641 |
| Range | 68.45 |

TABLE 3-continued

| | |
|---|---|
| Minimum | 2.35 |
| Maximum | 70.8 |
| Sum | 5976.76 |
| Count | 478 |
| Largest (1) | 70.8 |
| Smallest (1) | 2.35 |
| Confidence Level (95%) | 0.738 |

Figure 4:
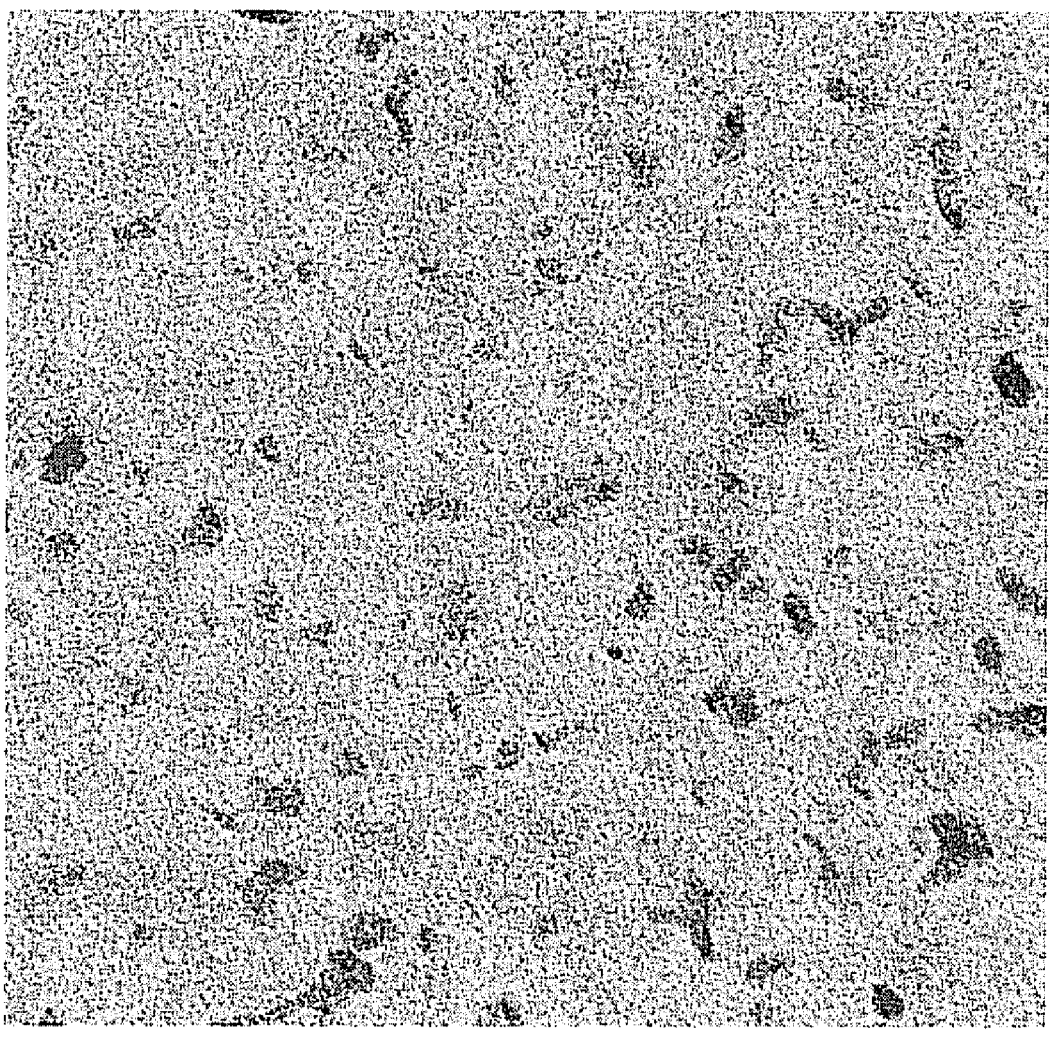
FIG. 4 is a photomicrograph of the foam manufactured in the Example 4.

From the Table 3 it can be seen that the foam has pore sizes of 2.35 to 70.8 nanometers. The average cell size is 12.5±8.2 nanometers. The foam bulk density was 950 kilograms per cubic meter (kg/m$^3$). A photomicrograph of the foam is shown in the FIG. 4. From the photomicrograph, it may be seen that the pores are fairly uniform in size in the nanometer range. The polysiloxane block domain density in LEXAN EXL sample was measured to be around $3.7 \times 10^{16}$ domains per cubic centimeter. The nucleation density of the foamed LEXAL EXL samples was measured to be around $1 \times 10^{16}$ cells per cubic centimeter. From these results it may be seen that the nucleation density and hence the cell density in the microporous foam is directly proportional to the density of the polysiloxane blocks in the polysiloxane block copolymer.

In one embodiment, the cell nucleation density in the nanoporous foam is within the same order of magnitude as the polysiloxane block domain density in the block copolymer. In another embodiment, the cell nucleation density is up to about 90%, specifically up to about 80%, and more specifically up to about 70% of the polysiloxane block domain density in the block copolymer. Thus by varying the polysiloxane block domain density in the block copolymer one can vary the cell nucleation density in the nanoporous foam.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A foam comprising:
a polysiloxane block copolymer; the polysiloxane block copolymer comprising a first block that comprises a polysiloxane block and a second block that comprises a polycarbonate, a copolyester-carbonate, a polyester, a polyarylate, or a combination comprising at least one of the foregoing polymers; the second block not containing a polysiloxane; the polysiloxane block being about 5 to about 45 repeat units; the foam having average pore sizes of less than or equal to about 100 nanometers; where the polysiloxane block has the structure

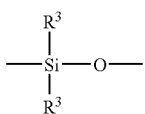

wherein each occurrence of R$^3$ is the same and is independently a C$_{1-6}$ hydrocarbyl.

2. The foam of claim 1, wherein the block copolymer has the structure of Formula (I)

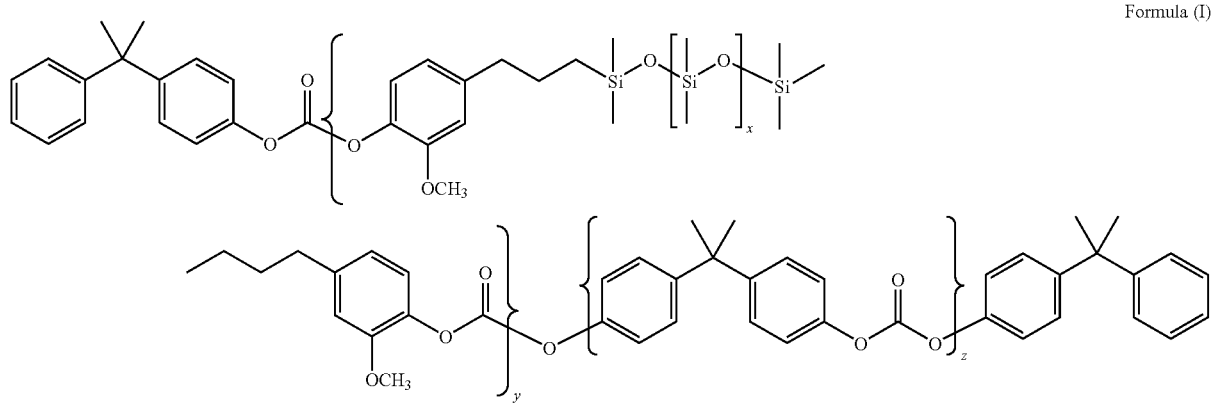

Formula (I)

where the polysiloxane blocks are endcapped with eugenol, where x is about 1 to about 45, y is about 1 to about 99 and z is about 1 to about 99.

3. The foam of claim 1, where the second block is a polycarbonate.

4. The foam of claim 3, Where the polycarbonate has a molecular weight of about 500 to about 50000 grams per mole.

5. The foam of claim 1, where the first block is present in an amount of about 1 to about 25 wt %, based on the total weight of the polysiloxane block copolymer.

6. The foam of claim 1, where the foam has individual pores that have diameters of about 1 to about 100 nanometers.

7. The foam of claim 1, where the foam has a transparency of about 70% to about 99% percent when measured at a thickness of 3 millimeters as per ASTM D 1003.

8. The foam of claim 1, where the foam has a bulk density of about 0.05 to about 1 grams per cubic centimeter.

9. An article comprising the foam of claim 1.

10. A method comprising:
    immersing a polysiloxane block copolymer with fluid to form a fluid saturated polysiloxane block copolymer; the polysiloxane block copolymer comprising a first block that comprises a polysiloxane block and a second block that comprises a polycarbonate, a copolyester-carbonate, a polyester, a polyarylate, or a combination comprising at least one of the foregoing polymers; the second block not containing a polysiloxane; the polysiloxane block being about 5 to about 45 repeat units;
    increasing the temperature of the fluid saturated polysiloxane block copolymer; and
    foaming the polysiloxane block copolymer to form a foam that has average pore sizes of less than or equal to about 100 nanometers.

11. The method of claim 10, where the fluid is carbon dioxide.

12. The method of claim 10, wherein the immersing is conducted at a pressure of about 20 kilograms-force per square centimeter to about 1,000 kilograms-force per square centimeter.

13. The method of claim 10, wherein the temperature is increased to about 50 to about 200° C.

14. The method of claim 10, further comprising quenching the foam into a bath maintained at a temperature that is below the glass transition temperature of the second block.

15. The method of claim 10, wherein the immersing of the polysiloxane block copolymer with fluid to form a fluid saturated polysiloxane block copolymer is conducted in an extruder or in an injection molding machine.

16. An article manufactured by the method of claim 10.

* * * * *